Figure 1:
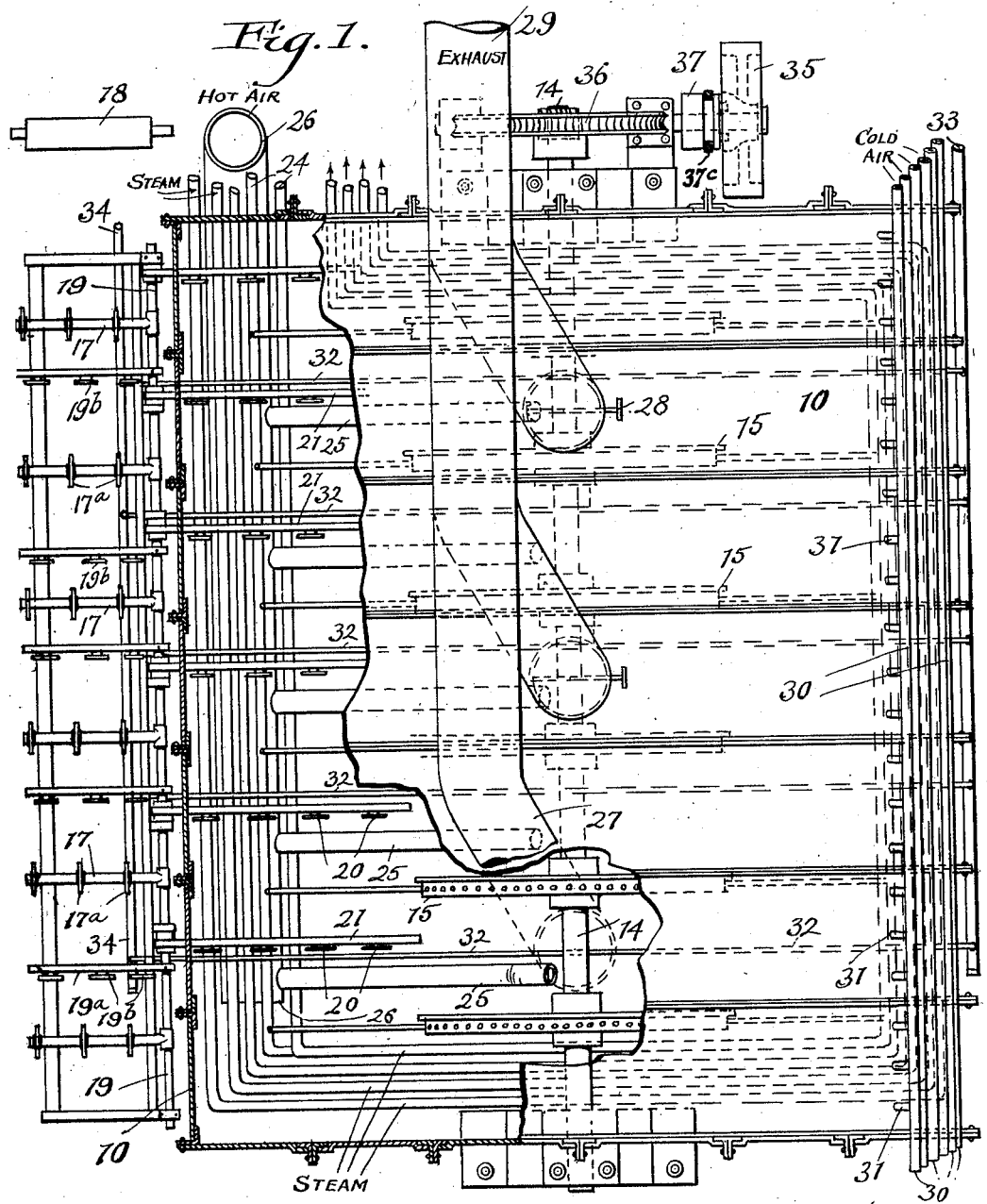

Oct. 27, 1925.

R. CATHCART

DRIER

Filed Aug. 2, 1918

1,558,835

3 Sheets-Sheet 3

Inventor
Robert Cathcart
by Thurston & Kwis
Attys

Patented Oct. 27, 1925.

1,558,835

UNITED STATES PATENT OFFICE.

ROBERT CATHCART, OF CLEVELAND, OHIO, ASSIGNOR TO THE LINO PAINT COMPANY, OF CLEVELAND, OHIO, A CORPORATION OF OHIO.

DRIER.

Application filed August 2, 1918. Serial No. 247,927.

*To all whom it may concern:*

Be it known that I, ROBERT CATHCART, a citizen of the United States, residing at Cleveland, in the county of Cuyahoga and State of Ohio, have invented a certain new and useful Improvement in Driers, of which the following is a full, clear, and exact description.

This invention relates to a method and apparatus for drying, and has particular reference to the drying of freshly painted metal sheets and plates or other articles required to be dried.

At the present time large metal sheets and plates of various gauges and sizes, such as so-called black sheets, galvanized or corrugated sheets, and other products utilized as roofing, ceiling, and siding products for buildings and mechanical purposes, are painted by running the articles between paint-saturated rolls, or by dipping them in a tank of paint, and are then placed on edge in a rack where they remain until they are dried. Although ineffectual attempts have been made to dry such articles artificially, it is generally the case that they are allowed to stand on edge until dried naturally, with the result that a great deal of time is consumed in the drying, and the services of a number of men are required to handle the articles after they have been coated with paint. One serious disadvantage of the slow natural drying lies in the fact that not only do the drying articles require a great deal of floor space, but they ofttimes become injured by contacting with the succeeding lapping sheets or articles. This necessarily not only requires a great area of floor space, but actually limits the production.

The principal object of this invention is to provide a method and apparatus by which articles such as metal sheets and plates of the type referred to, can be quickly dried, thus effecting a great saving of time in the drying process and eliminating the necessity for hand labor in handling the sheets.

In accordance with my invention the sheets, plates or other articles are received from the paint rolls or other paint applying apparatus and caused to pass into a chamber through which they are conveyed and in transit subjected to a quick drying process, and from which they are discharged onto a truck or other suitable conveyor. The method of and apparatus for drying the articles in this chamber constitute the principal features of the invention, the latter contemplating the preheating of the articles during one stage of their travel, and the quick driving off of the volatile substances or moisture, and the subsequent rapid cooling which brings about the quick evaporation and effective drying.

More specifically considered, the new process includes the preheating by conveying the articles through a suitably heated portion of the chamber so as to cause the evaporation of the more volatile substances or products such as the solvents used in the paint, and then subjecting the articles alternately to suitably directed streams of a heating medium such as hot air which further raises the temperature of the articles and drives off the fumes which are given off from the plates during the preheating stage, and to streams or jets of a cooling medium such as cold air which causes the complete evaporation and drying and cooling so that the articles may be discharged from the outlet side of the chamber at substantially room temperature and in a completely dry state although the time consumed in their travel from the inlet side of the chamber to the outlet is very small, the actual time varying with the size of the article, but generally not in excess of three minutes, for a 30" by 78" plate.

Further features of the invention reside in the manner in which the preheating, also the final heating and fume or moisture removing and subsequent cooling are accomplished and in the method of condensing the evaporated products during the cooling and drying stage. Still further the invention resides in various parts and combinations of parts of the aparatus for accomplishing the results above stated.

In the accompanying sheets of drawings wherein I have shown apparatus for drying sheets or plates, Fig. 1 is a plan view of one form of apparatus which may be used for effectively carrying out the invention, parts being broken away to more clearly show the interior construction; Fig.

Figure 3:
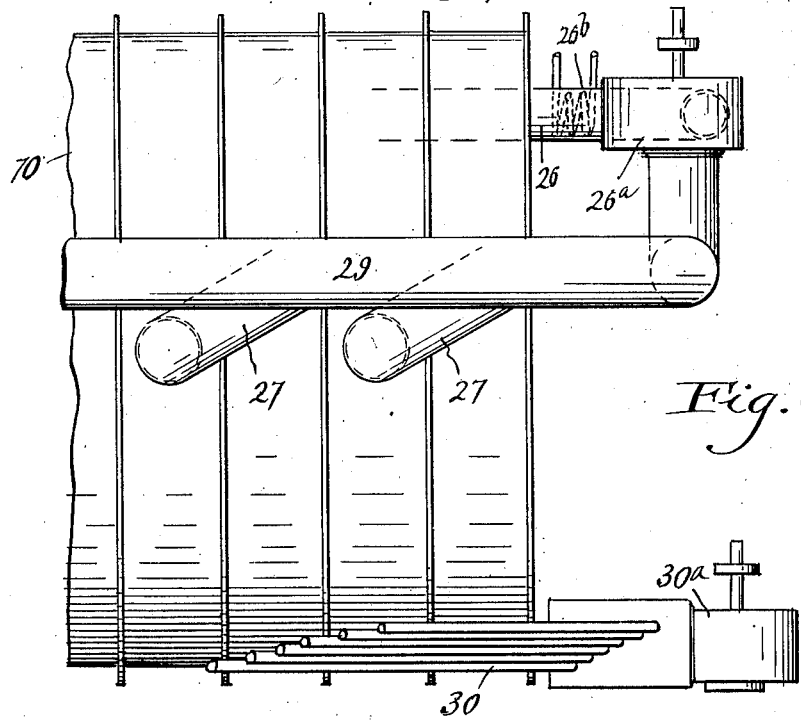
Figure 4:
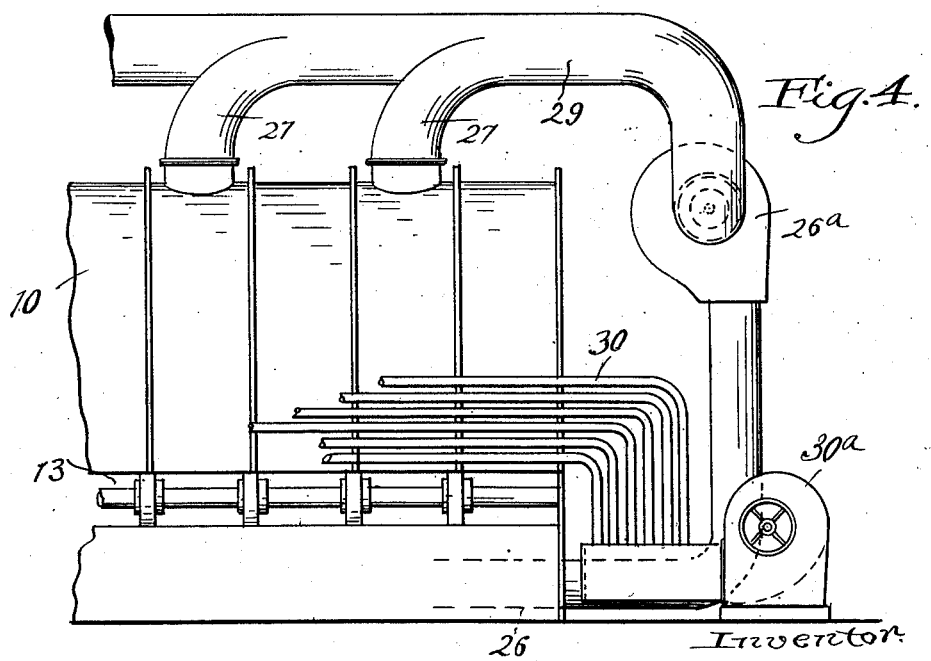

2 is a transverse sectional view of the same; Fig. 3 is a top plan view of a part of the apparatus; and Fig. 4 is a side view of a part of the same.

In carrying out my invention for drying sheets or plates I employ a chamber preferably substantially cylindrical in shape, and as here shown, formed by a substantially semi-cylindrical horizontal dome 10 resting on a suitable base 11 such as a concrete base recessed to form an arc-shaped pit through which portions of a conveyor or carrier, here shown in the form of a reel rotates, and provided along the sides of the pit with ledges 11ª and 11ᵇ on which various parts including piping which extend lengthwise and crosswise of the chamber, are supported. At one side of the dome 10, and preferably extending substantially the full length thereof is an inlet opening 12 for the plates or other articles to be dried, and substantially diametrically opposite from the inlet opening there is a similar outlet opening 13 through which the dried plates or articles are discharged.

Although other forms of conveyors may be employed as hereinafter explained, in this instance there is rotatably supported in the chamber or dome by means of suitable standards at the ends thereof, a shaft 14 which is preferably rotated step by step in a manner to be hereinafter referred to, and on this shaft is a conveyor in the form of what may be termed a reel and consisting of a number of wheels 15, each comprising a hub 15ª, spokes 15ᵇ and a rim 15ᶜ carrying a large number of article supporting arms or rods 15ᵈ, each of the latter being about half way between a radial and tangential position. The form or type of conveyor will depend on the form or character of articles to be dried, the present conveyor being shown for the reason that the apparatus herein illustrated is employed for drying plates or sheets with which my invention has especial utility. With this form of conveyor the stated position or direction in which the arms or finger 15ᵈ extend outwardly is of great importance and a big factor in the practical success of the invention. The individual plates are adapted to be supported between the arms 15ᵈ, each plate if long enough, being supported on one of the arms of each of these wheels.

Alongside the dome at the inlet side thereof is a frame 16 constituting a trackway provided at the top with a series of transverse shafts 17 provided with rollers 17ª along which the plates are adapted to be run, this trackway being preferably positioned directly in line with the paint applying apparatus such as paint rolls, one of which is shown in plan at 18 in Fig. 1, so that the plates after passing between the paint rolls will run along the rollers 17ª to a position in front of the inlet opening. The trackway likewise carries a longitudinally extending rock shaft 19 to which are secured arms 19ª extending across the trackway and provided with rollers 19ᵇ which are at right angles to the rollers 17ª. These rollers 19ᵇ are normally below the tops of the track rollers 17ª, but when a plate has been run onto the trackway in front of the opening 12 by rocking the shaft 19 as by a suitable pedal mechanism, indicated at 19ᶜ in Fig. 2, to substantially the position shown by dotted lines in Fig. 2, these rollers 19ᵇ will pick up the plate and incline it so that it can slide into the dome, and by running over similar rollers 20 supported by stationary arms 21 alongside the wheels 15 of the reel, these plates will be caused to be run into the reel between two of the spokes of each wheel.

As the reel is rotated step by step, the plates will be carried each in a position about half way between the radial and tangential, around toward the outlet opening 13 and eventually they will engage rollers 22 supported on inclined arms 23 extending inwardly from the outlet opening 13, the rollers 22 being similar to the rollers 20, and the arms 23 being similar to the arms 21, in consequence of which the plates will successively slide over these rollers 22 and will pass out through the outlet opening 13 of the dome onto a suitable truck or other conveyor adapted to convey away the dried plates.

We come next to the means by which the plates are preheated then further heated and freed of fumes or moisture and subsequently cooled to effect the drying action in the manner previously briefly outlined. It will be observed that the lower part of the dome is encircled or circumscribed by a series of steam pipes 24, which as will be seen from Fig. 1, enter the dome at one end, just above the ledge 11ª, pass along one side of the dome below the inlet opening 12, then across one end of the dome, then along the opposite side, and then along the opposite end where they emerge from the dome. These steam pipes heat the air for the preheating stage of the drying process, the plates being preheated through about half their travel from the position at which they enter the reel to the position at which they leave the reel. In other words for about 90° of movement since the plates leave the dome at a point about diametrically opposite from the point at which they enter the dome.

During this preheating stage the plates are not subjected to a blast of air as they are subsequently, but they are heated by the heated air which rises from the steam heated pipes 24 and passes out through the top of the dome in the manner hereinafter described. It is during this period that the more volatile materials of the painted plates are evaporated. This forms fumes, the major portion of which in practice cling to the rotating plates, until the plates reach a certain position.

While I have shown steam pipes for producing the heat for the preheating step of the process, I do not wish to be confined to steam pipes as other means might be employed for this purpose.

Next the preheated plates are subjected to the action of a heating medium preferably a blast of heated air after having traveled through about half their movement or through an arc of about 90°, as before stated. This hot air blast is provided by a series of branch pipes 25, the outlet ends of which are near the shaft 14 and between the wheels forming the plate supporting and rotating reel. It will be observed by reference to both Figs. 1 and 2 that these branch pipes 25 extend upwardly and inwardly from a relatively large hot air feed pipe 26 which is just above the ledge 11ª and is surrounded by the steam pipes 24 where they extend along the inlet side of the dome. The heated air is supplied by a suitable fan, 26ª shown in Figs. 3 and 4, and the air is preferably heated by passing it through heating coils 26ᵇ (Fig. 3) which may be steam heated, though the steam pipes 24 may be relied on for this purpose since the arrangement shown at the left hand side of Fig. 2 is suitable for heating the air in pipe 26.

Extending from the top of the dome are a series of branch hot air exhaust pipes 27, each with a damper 28 which is near the top of the dome (see Fig. 2), which pipes are connected to a main exhaust pipe 29 which may and preferably is connected to the inlet side of the fan 26ª which circulates the air through the hot air pipe 26 so that there will be a continuous circulation.

The effect of subjecting the plates to the hot air blast through the pipes 25 is to still further raise the temperature of the plates over the temperature to which the plates were gradually raised in passing through the preheating stage, and a further effect is to blow off of and from between the plates the fumes or gases formed by the evaporation of the more volatile materials such as the solvents utilized in the paint. The hot air and these fumes pass out from the top of the dome through the pipes 27 and 29, the major portion of the fumes being condensed after they leave the dome and before the air is again reheated and recirculated back through the dome by way of the pipe 26 and branch pipes 25. However, the condensate at this point is very small, and no means need be provided for removing it as practice has demonstrated, and no special condenser is needed as the moisture condenses by coming in contact with the surfaces of the pipes which are cooler than the dome.

Figure 2:
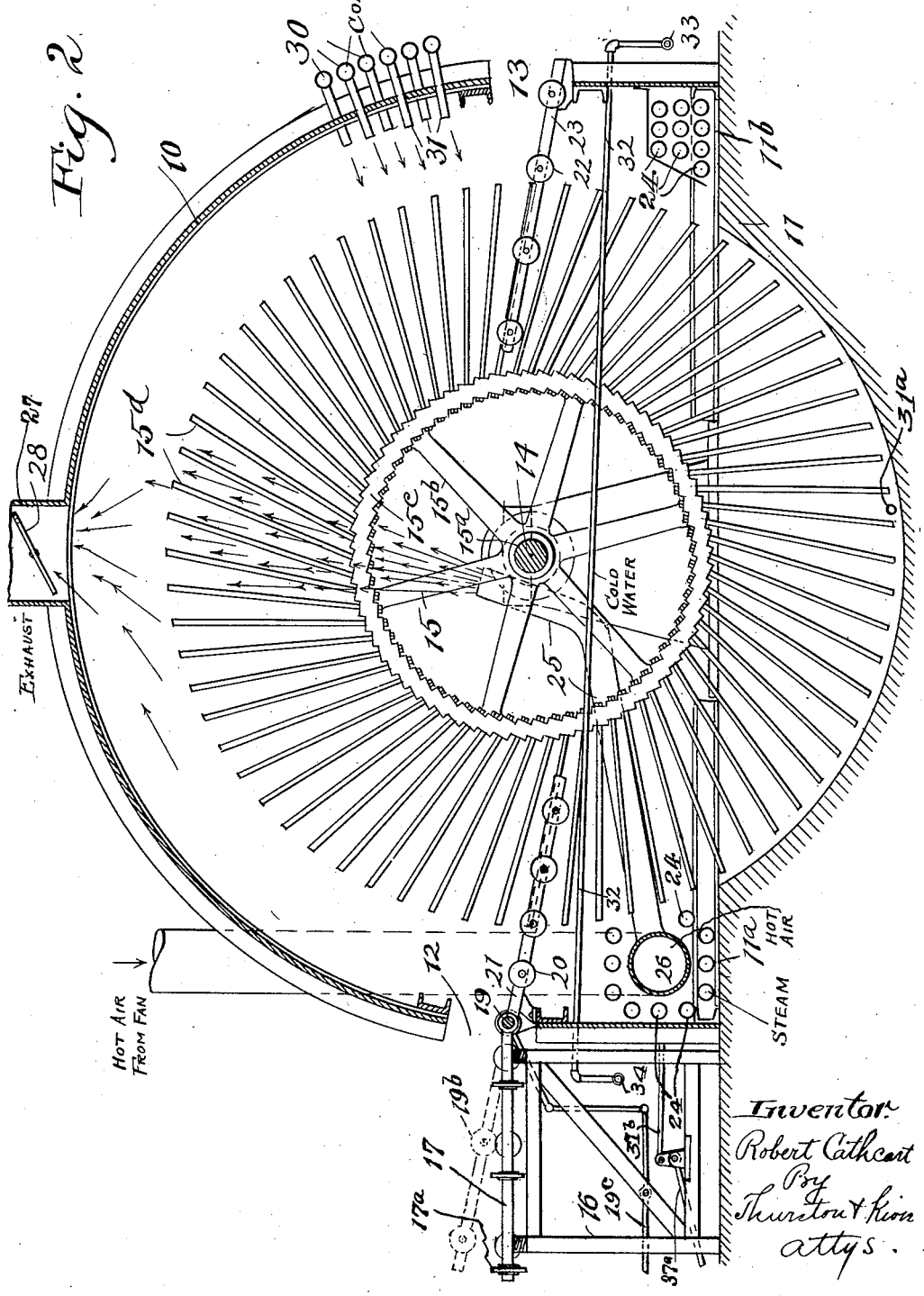

Next the plates are subjected to the action of a cooling medium, preferably cold air which is preferably supplied by a series of cold air pipes 30 which extend legthwise of the dome it being immaterial whether they extend outside or inside the dome, but preferably outside, as here shown, just above the outlet opening 13, and which will be best seen by reference to Fig. 2. Each of these cold air pipes 30 has a series of outlets on nozzles 31 which extend downwardly and inwardly through the wall of the dome so that the cold air will be directed onto the plates shortly after they pass beyond the streams of air supplied by the hot air pipes 25. This quickly cools the plates and almost instantaneously dries them. The air may be supplied to the pipes 30 by any suitable means, such as by a fan 30ª, shown in Figs. 3 and 4. After a short further movement they engage the rollers 22, and automatically slide out from the dome through the outlet opening 13 onto a truck or other device provided to receive the plates, and when they pass from the dome they are thoroughly dried and at a temperature corresponding almost precisely with the room temperature.

The cold air utilized in cooling and drying the plates after leaving the latter nearly saturated with moisture, passes downwardly toward the pit in view of the fact that it is much heavier than the heated air, and in passing downwardly comes in contact with cooling pipes 32 which may be water cooled and which extend transversely across the chamber beneath the shaft 14, as best shown in Fig. 2. Most of the moisture carried away from the plates by the downwardly passing air currents is condensed on these pipes and drops to the bottom of the chamber. A suitable outlet 31ª may be provided for draining off liquid accumulating in the bottom of the tank. The water is supplied to and conveyed away from the pipes 32 by a water supply pipe 33 and a water exhaust pipe 34, these pipes extending alongside the dome, one on one side and one on the other.

The reel is turned step by step, as before stated, and this is accomplished be mechanism including a source of power here shown as a pulley 35 (see Fig. 1), driving a shaft which is connected by worm and worm wheel gearing designated as a whole by the reference character 36, to the shaft 14 of the reel. Between the pulley and worm wheel gearing is a clutch shown conventionally at 37. This clutch can be and preferably is operated by suitable mechanism such as a foot pedal 37ᵃ (Fig. 2) which will be located close to the foot pedal 19ᶜ which the operator manipulates to cause the plates to slide from the trackway into the chamber, said pedal 37ᵃ being connected by a rod 37ᵇ with a suitable clutch shifter 37ᶜ for shifting the clutch 37, as shown in Figs. 1 and 2. In this manner the plates can be fed into the chamber and into the reel, and the reel can be turned step by step as fast as the plates can be run through the paint rolls, and as the step by step movement is given to the reel rapidly, the reel is given substantially a half rotation sufficient to carry a plate from the inlet side to the outlet side in a very brief space of time. But in this short space of time each plate as it emerges is completely dried and cooled to substantially room temperature, the temperature of the plates as they emerge from the chamber rarely varying more than a degree from room temperature. However, the temperature at which the articles emerge in any particular installation depends on the character of the articles and the temperatures of the heating and cooling media.

Thus it will be seen that with this process an enormous saving of time is effected in the drying operation and that the necessity for a huge floor space heretofore utilized for the racks of drying plates is entirely eliminated. Furthermore, aside from the fact that one operator manipulates foot pedals to cause the plates to enter the chamber and the reel to be moved through a predetermined arc, the whole operation is automatic, it being unnecessary for laborers to pick up or handle the plates as has heretofore been necessary.

This method of drying is operative regardless of weather conditions both as to temperature and moisture, the same speed and the same drying effects being obtainable in cold weather as warm weather, and when the humidity is high as well as when it is low, it being only necessary to adjust the apparatus to suit the weather conditions. This adjustment or adjustments include the adjustment or variation of the quantity and temperatures of the hot and cold air and the manipulation of the dampers 28 to increase or decrease the freedom of movement of the heated air from the top of the dome. I have not shown the valves for varying the flow of hot and cold air, nor the means for varying the temperature of the air, but it will be obvious that such devices will be provided wherever necessary, to adapt the apparatus and the method for all conditions including weather conditions and the conditions of the articles to be dried with respect to moisture.

Other ways of carrying out the principle of my invention may occur to one skilled in the art, and I aim in my claims to cover all modifications and changes which do not involve a departure from the spirit and scope of my invention in its broadest aspects.

Having described my invention, I claim:

1. The method of drying articles which comprises conveying them with an arcuate movement through a chamber, and while so doing passing the articles successively through streams of heating and cooling media.

2. The method of drying articles which comprises preheating the articles and then successively subjecting them to the action of a heating medium which heats the articles more rapidly than in the preheating stage and still further raises their temperature, and to the action of a cooling medium.

3. The method of drying articles which comprises conveying the articles through a chamber and in transitu first preheating the articles and subsequently subjecting the articles to the action of a flowing heating medium and then a flowing cooling medium, the heating medium increasing the temperature of the articles over that reached in the preheating stage and heating them more rapidly than in the preheating stage.

4. The method which comprises conveying articles through a chamber and in transitu drying the same by carrying the articles first through a heated portion of the chamber, then through a stream of a relatively fast moving heating medium which further elevates the temperature of the articles, and then through a stream of a cooling medium.

5. The method of drying articles which comprises passing them through a chamber first through a preheating stage where the temperature of the articles is raised to a predetermined point by a relatively still heating medium, then through a stage where the articles are subjected to the action of a relatively fast moving heating medium where the temperature is still further raised, and then through a stage where the articles are subjected to the action of a cooling medium.

6. In an apparatus for drying articles, a chamber having an inlet side and an outlet side, means for conveying the articles from the former to the latter with an arcuate movement, and means for supplying to the chamber heating and cooling media through which the articles are successively passed.

7. In a drying apparatus, a chamber having an inlet side and an outlet side, a device for conveying the articles from the former to the latter, means for heating a portion of the chamber toward the inlet side, and additional means for supplying a heating medium and a cooling medium through which the articles are successively passed.

8. In an apparatus for drying articles, a chamber having an inlet opening and at a distance therefrom an outlet opening, a conveyor in the form of a rotary reel adapted to receive the articles when inserted through the inlet side and to discharge the articles through the outlet side, and means whereby the articles while traveling through the chamber are alternately heated and then cooled and dried.

9. In an apparatus for drying articles, a chamber having an inlet opening and at a distance therefrom an outlet opening, a conveyor adapted to receive the articles when inserted through the inlet side and to discharge the articles through the outlet side, means for preheating the articles as they pass from the inlet side, and means for supplying to the chamber streams of a heating medium and of a cooling medium through which the articles are successively passed after being preheated.

10. In an apparatus for drying articles, a chamber having at one point an inlet opening for the articles, and at a different point an outlet opening, a conveyor for supporting and conveying the articles from the inlet opening to the outlet opening, means for heating one side of the chamber, means for causing a heating medium to be directed onto the articles to be dried, and means for causing a cooling medium to be directed onto the articles to be dried, said articles being alternately conveyed through the heated portion, through the heating medium and through the cooling medium.

11. In a drying apparatus, a chamber having an inlet opening at one point and an outlet opening at a different point, a conveyor for conveying articles from the inlet point to the outlet point, heating means extending adjacent the inlet point, means for conveying a heating medium and for discharging the same onto the articles carried by the conveyor while passing through a predetermined portion of their path of movement, means for directing a cooling medium onto the articles after passing from the heating medium, and an outlet at the top of the chamber.

12. In a drying apparatus, a chamber having an inlet opening at one point and an outlet opening at a different point, a conveyor for conveying articles from the inlet point to the outlet point, means for heating a portion of the chamber interior through which the articles initially pass, means for conveying a heating medium and for discharging the same onto the articles carried by the conveyor while passing through another portion of their movement, means for directing a cooling medium onto the articles after passing from the heating medium, and moisture condensing means in the chamber.

13. In a drier, a chamber, a rotary carrier in the chamber having outstanding fingers arranged between the radial and tangential positions and adapted to receive between them articles to be dried, and means whereby the articles are successively heated and cooled while being carried by the carrier through the chamber.

14. In a drier, a chamber having openings for the admission and withdrawal of articles, a carrier in the chamber having outstanding fingers between which articles to be dried are adapted to be inserted, and means for subjecting the articles while being conveyed by the carrier from the admission to the withdrawal openings, alternately to streams of a heating medium and a cooling medium.

15. In a drier, a chamber having openings for the admission and withdrawal of articles to be dried, a carrier for conveying the articles through the chamber, means for heating the articles as they are conveyed through the chamber, means for subjecting them to the action of a cooling medium before the articles reach the withdrawal opening of the chamber, and means in the chamber for condensing the moisture in said medium after coming in contact with and cooling the articles.

16. In a drier, a chamber having a conveyor for conveying articles to be dried, means for heating the articles, means for directing a cooling medium on the articles, and condensing means to which said medium flows after contacting and cooling the articles.

17. The method of drying articles which comprises conveying the articles through a chamber, heating the articles by directing a heating medium onto the same in a predetermined direction with reference to the surfaces of the articles.

18. The method of drying articles which comprises conveying the articles through a chamber, heating the articles, and then cooling the articles by directing a cooling medium on the articles in a predetermined direction with respect to their surfaces.

19. The method of drying articles which comprises conveying them through a chamber, and alternately subjecting them to the action of a heating medium and to the action of a cooling medium with each medium directed onto the articles in a predetermined direction with reference to the surfaces and path of movement of the articles.

20. In a drier, a chamber arc-shaped in cross-section, a conveyor for conveying articles to be dried from one part of the chamber to another with an arcuate movement, and means for alternately heating and cooling the articles as they are conveyed through the chamber.

21. The method of drying articles which comprises conveying the articles through a chamber, with the articles arranged in a predetermined position with respect to one another, and first heating them and then cooling them, the heating medium being directed in the form of a stream along the articles and in a particular direction with respect to the angle of repose of said articles.

22. The method of drying articles which comprises conveying the articles through a chamber while arranged in a predetermined relation with respect to one another, and while thus conveyed heating the articles and then cooling them, the cooling medium being directed in the form of a stream so as to pass along the surfaces of the articles and in a given direction with reference to their angle of repose.

In testimony whereof, I hereunto affix my signature.

ROBERT CATHCART.